Oct. 7, 1969

J. B. CONNELL 3,471,686

ERROR DETECTION SYSTEM FOR SYNCHRONIZED DUPLICATE DATA PROCESSING UNITS

Filed Jan. 3, 1966

4 Sheets-Sheet 1

INVENTOR
J. B. CONNELL
BY John C Albrecht
ATTORNEY

Oct. 7, 1969 J. B. CONNELL 3,471,686

ERROR DETECTION SYSTEM FOR SYNCHRONIZED DUPLICATE DATA PROCESSING UNITS

Filed Jan. 3, 1966 4 Sheets-Sheet 3

United States Patent Office 3,471,686
Patented Oct. 7, 1969

3,471,686

ERROR DETECTION SYSTEM FOR SYNCHRONIZED DUPLICATE DATA PROCESSING UNITS

Joseph B. Connell, Lincroft, N.J., assignor to Bell Telephone Laboratories Incorporated, New York, N.Y., a corporation of New York Filed Jan. 3, 1966, Ser. No. 518,210
Int. Cl. G06f *11/00, 7/02;* G08b *29/00*
U.S. Cl. 235—153 16 Claims

ABSTRACT OF THE DISCLOSURE

A data processing arrangement is disclosed wherein synchronized duplicate processing units perform identical processing functions on duplicate input data. A matching arrangement is provided in each processor for matching data obtained from a data source within that processor with data obtained from a corresponding data source within the other processor. A pair of data buses is used to gate data from selected data sources in each processor to the data matching arrangements during different time intervals within a single machine cycle of the data processing arrangement.

This invention relates generally to data processing systems and more particularly to the detection of processing errors in a system employing duplicate data processing units.

Numerous system environments in which data processing units serve as major control elements require a high degree of operational dependability. In many instances it is imperative that a system operate continually without any interruption. An illustrative example of such a system is the telephone switching system described in the copending patent application Ser. No. 334,875 of Doblmaier et al., filed Dec. 31, 1963.

When continuity of operation is an important factor in a particular system environment, dependability is often increased by the provision of duplicate data processing control units. The duplicate processing units perform the same internal functions on duplicate input information. Only one processing unit is in control of the system at any given time. Should trouble be encountered in the operations of the processing unit currently controlling the system, system controls can be transferred to the duplicate processing unit so as to maintain continuous dependable system operation.

In a processing arrangement employing duplicate processing units, it is imperative that processing errors in either processing unit are detected immediately upon their occurrence. Immediate error detection facilitates timely diagnosis of error causes and permits appropriate maintenance actions to be taken before spurious system control operations occur as a result of further errors.

It is an object of my invention to improve and expand error detection facilities in data processing arrangements which employ duplicate processing units and thereby increase the operational dependability of such arrangements.

In processing systems employing duplicate data processing units which normally perform the same internal functions on duplicate data inputs, the data flow through corresponding locations in each of the processing units at any given time should be identical. Accordingly, processing errors can be detected by periodically matching data which is obtained simultaneously from corresponding sources in the two processing units. If the data thus obtained does not match, either different input data was received by the processors or one of the processing units is not operating properly. This type of error detection arrangement is provided in the control unit of the system described in the aforenoted Doblmaier et al. patent application. Identical matching operations are performed simultaneously in each of the duplicate processing units on data obtained simultaneously from corresponding sources in the processing units. Such matching operations can be performed only once during each machine cycle of the processing units. Thus, data flow through only one group of corresponding locations in the duplicate processing units can be checked during a single machine cycle.

Data processing errors can occur at any time during a machine cycle and at any of a plurality of locations in a processing unit. Accordingly, a matching arrangement which performs only a single match operation during a machine cycle can overlook processing errors occurring during one machine cycle at a time or location other than that utilized in the match operation of that cycle.

It is further object of my invention economically to increase the data matching capacity of a processing arrangement employing duplicate processing units so as to provide more immediate detection of processing errors at a larger number of locations within the processing units.

These and other objects of my invention are achieved in one illustrative embodiment thereof wherein duplicate processing units are provided with individually operable data matching systems. The matching systems perform independent data matching operations in each processing unit on data obtained from corresponding sources in the two processing units during any one of three time periods within a machine cycle. This arrangement permits the performance of two separate data matching operations on data obtained during a single machine cycle. One matching operation is performed in one processing unit during one time period of a machine cycle on one set of corresponding data from both processing units. Another matching operation is performed in the other processing unit during another time period of the same machine cycle on another set of corresponding data from both processing units.

Match result indications are cross-coupled between the processing units so that an error indication is provided in both units in response to detecton of a match error in either of the units. The match result signals provided by each processor are mutually exclusive in time and separate provision for their registration is made in each processor. Accordingly, that portion of a match cycle during which a match result signal is generated in one processor can overlap a succeeding match cycle during which data is being obtained for matching in the other processor. When an error indication is given, appropriate maintenance action can be taken to ascertain the cause of the error and to initiate any necessary adjustments in the operational control of the system.

An illustration of the type of system maintenance actions which may be taken when a match error is encountered is described in the copending patent application Ser. No. 518,280 of Brass, Connell and Harr, now U.S. Patent 3,408,628, issued Oct. 29, 1968, filed on even date herewith and of which I am a coapplicant. This copending application describes, inter alia, the cooperation of my present invention in an illustrative telephone switching system and indicates some illustrative locations in duplicate processing units from which data to be matched can be obtained.

In accordance with a feature of my invention, each of two duplicate data processing units, performing identical work functions on duplicate input data, performs an independent matching operation on data obtained simultaneously from corresponding sources in the two processing units during a different time period of a single machine cycle.

In accordance with another feature of my invention, two duplicate data processing units, performing identical work functions on duplicate input data, perform independent matching operations on data obtained from different corresponding sources in the two processing units during a single machine cycle.

A more complete understanding of my invention and of these and other features thereof will be gained from the following description when read with reference to the accompanying drawing in which.

Figure 1:
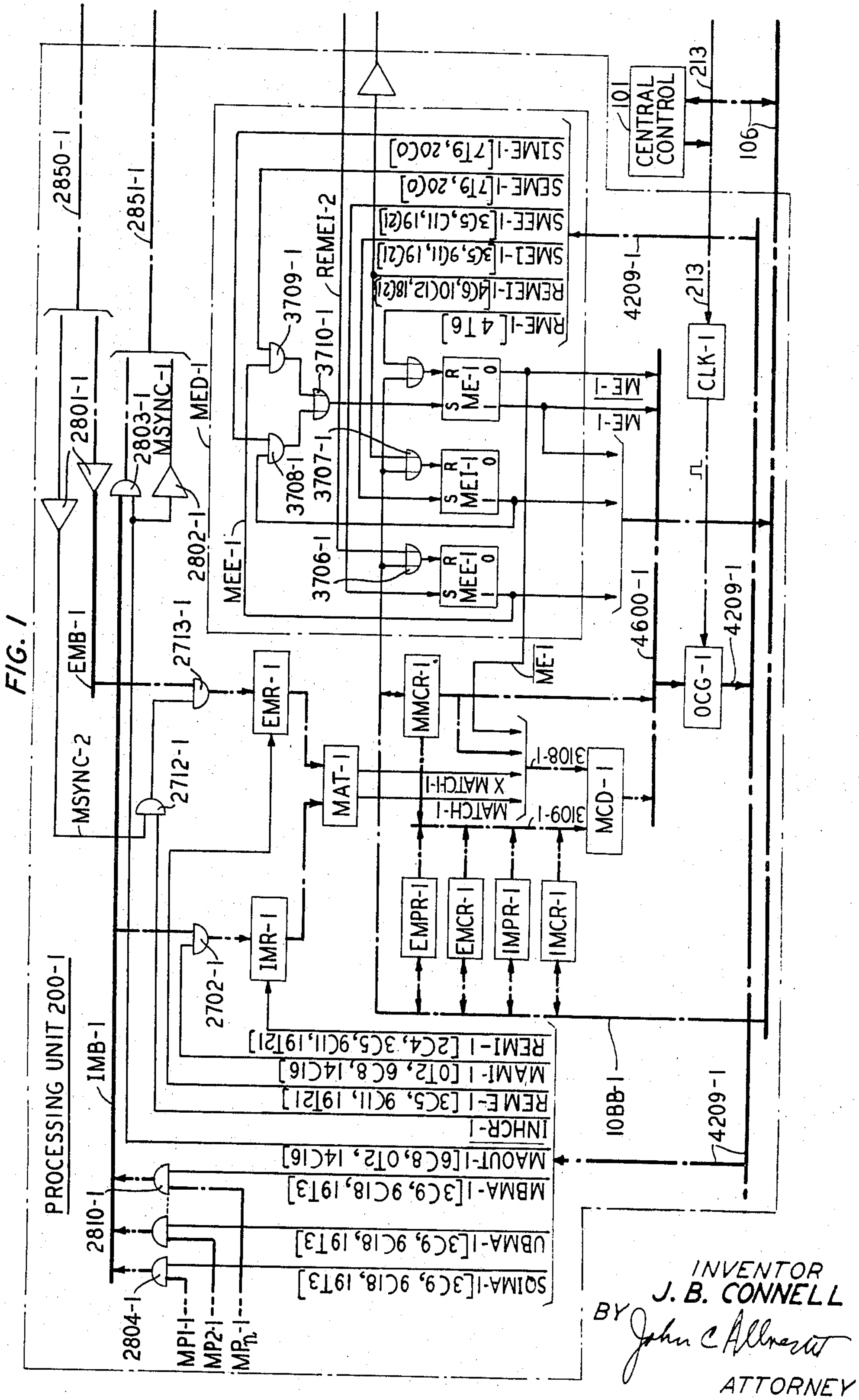
FIGS. 1 and 2 are, when arranged in accordance with FIG. 5, a block diagram of a data matching arrangement incorporated in two identical processing units.
Figure 2:
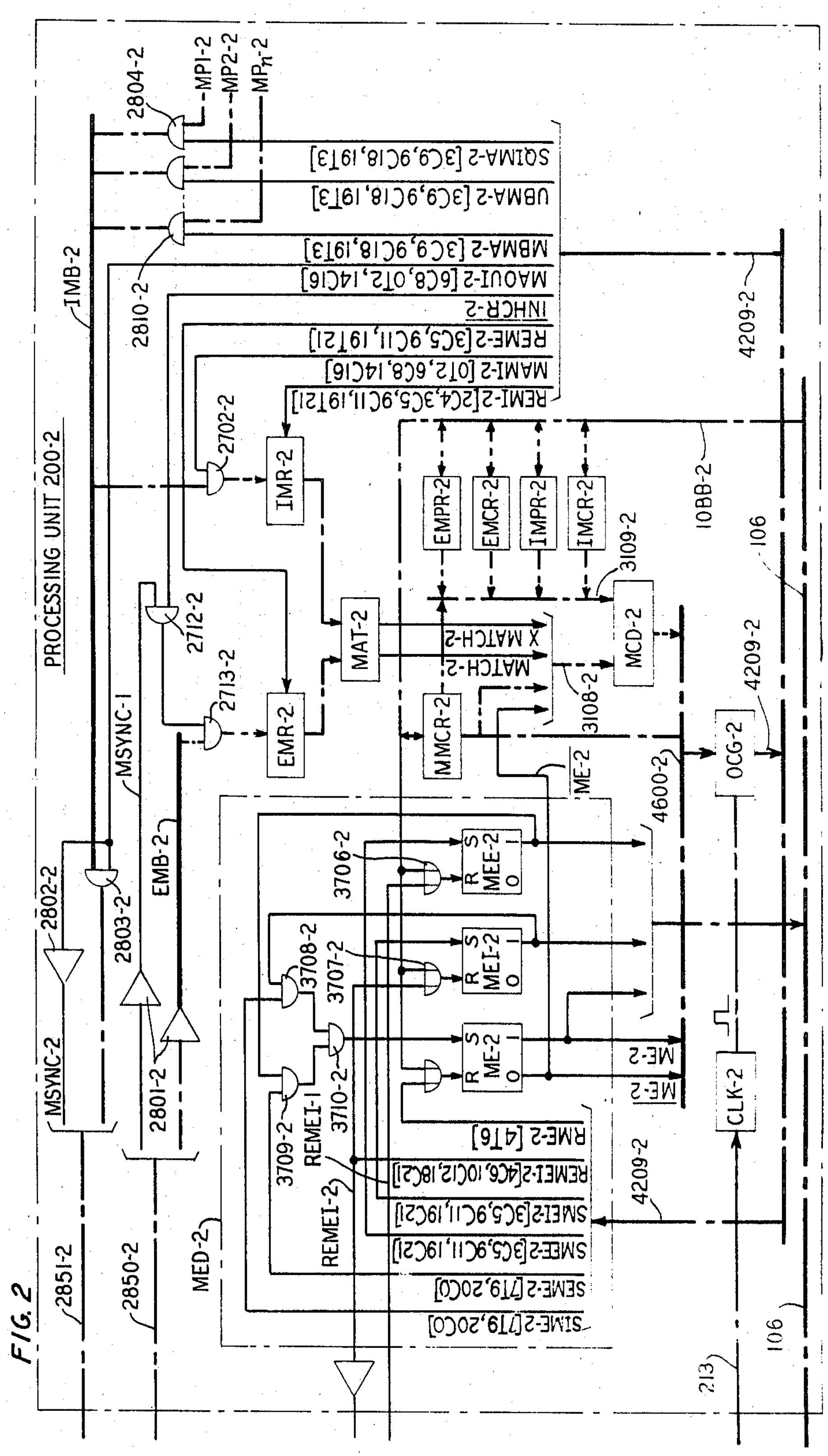

FIGS. 1 and 2 illustrate the data matching systems of two duplicate processing units 200–1 and 200–2. The data processing and other operative portions of processing units 200–1 and 200–2 are not shown since they are not necessary to an understanding of my invention. It is believed that the mass of circuit detail necessary to show the remaining portions of the respective processing units 200–1 and 200–2 would tend to obscure an understanding of my invention and that the omission thereof will facilitate comprehension of the description given heerin. An illustration of the incorporation of the data matching systems of my invention into duplicate processors is fully described in the aforenoted copending patent application of Brass et al.

The alphabetical and numerical designations employed in the drawings of the present application correspond as far as possible with those employed to designate corresponding components in the Brass et al. application. To further facilitate cross reference of the present application with the aforenoted Brass et al. application, a table is included later herein setting forth the component parts of the various circuit blocks shown in the drawing of the present application in terms of the more detailed showing in the drawing of the Brass et al. application.

In many instances throughout the drawing, single lines are utilized symbolically to represent a plurality of connections such as a cable or a bus. The nature of such connections is indicated in the specification when reference is made thereto.

In FIGS. 1 and 2 of the drawing, logical gates and symbols of amplifiers represent in many cases a plurality of gates or amplifiers comprising a number of channels equal to the number of individual signals to be transmitted therethrough. For example, AND gates 2804–1 on FIG. 1 represent a plurality of AND gates equal in number to the number of bits of information on internal match bus IMB–1 which are transmitted through AND gates 2804–1 when a signal is present on conductor SQ1MA–1. Similarly, amplifiers 2801–1 on FIG. 1 represents a plurality of amplifiers equal in number to the number of information bits received over the conductors of cable 2850–1. The AND gate symbol and the amplifier symbol, therefore, represents a plurality of AND gates or amplifiers equal in number to the number of information paths included in a cable.

Processing units 200–1 and 200–2, portions of which are shown in FIGS. 1 and 2, operate synchronously and in parallel; i.e., they normally perform identical work functions at the same time on duplicate input information. This type of in-step operation is described in detail in the aforenoted copending applications of Doblmaier et al. and Brass et al.

In this one illustrative embodiment of my invention, both processing units 200–1 and 200–2 function within a basic machine cycle of 5.5 microseconds. A machine cycle is that period of time during which a processor can perform the series of sequential actions required to execute the shortest instruction. The various operational sequences of each processing unit 200–1 and 200–2 are controlled by timing pulses generated by clock circuit CLK–1 and CLK–2 in the respective processing units 200–1 and 200–2. Both clock circuits CLK–1 and CLK–2 are synchronized by phasing signals transmitted from a central control circuit 101 over a communications path 213. Central control circuit 101 also operates synchronously with the processing units 200–1 and 200–2. Illustrations of the generation of clock synchronizing signals by a central control and the transmission thereof to duplicate processors are described in the aforementioned application of Brass et al.

Figure 3:
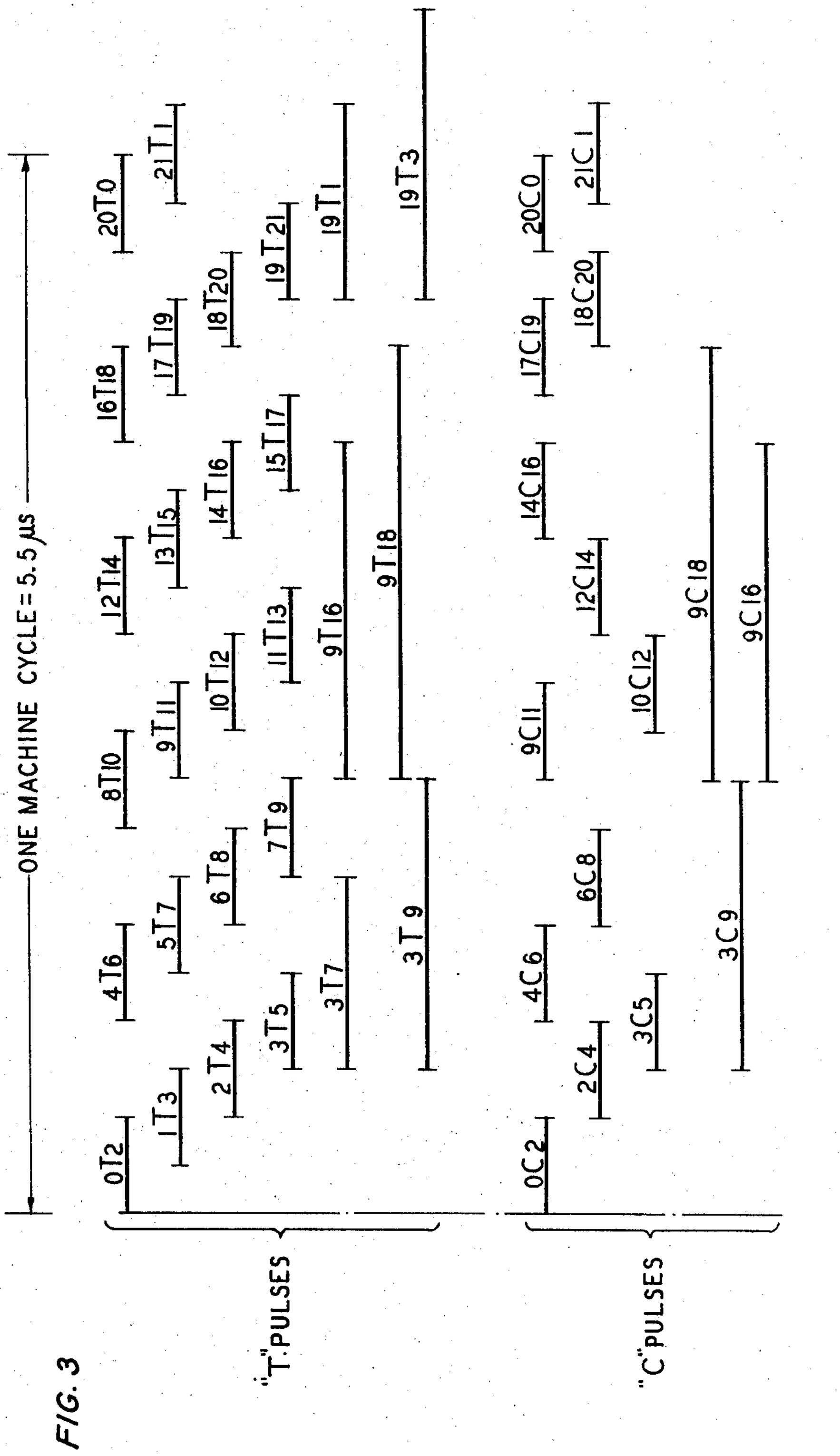
FIG. 3 is a timing diagram illustrating the division of one machine cycle into a plurality of timing pulses.

The basic 5.5 microsecond machine cycle of each processing unit 200–1 and 200–2 is divided into twenty-two one-quarter microsecond time intervals designated 0T1 through 21T0. Each of the clock pulses generated by clock circuits CLK–1 and CLK–2 is derived from a combination of these time intervals, as illustrated in FIG. 3. The clock pulses are designated *b*T*e* where *b* is the number assigned to the instant at which the clock pulse begins and *e* is the number assigned to the instant at which the clock pulse is ended. These timing signals are logically combined with other input information by order combining gate circuits OCG–1 and OCG–2 of the respective processors 200–1 and 200–2 to produce the gating and control signals which initiate all internal operations of the processing units 200–1 and 200–2. A more detailed description of an illustrative clock circuit and an illustrative order combining gate circuit is presented in the aforenoted Brass et al. patent application.

Although the processing units 200–1 and 200–2 normally operate in parallel and perform the same internal work functions, a distinction between the units is maintained with reference to the rest of the system external to the two processing units 200–1 and 200–2. One processing unit is considered to be in the active condition and the other processing unit is considered to be in the standby condition. The active processing unit is the one presently exerting operational control over external parts of the over-all system; whereas the standby processing unit is merely duplicating the internal operations of the active unit and effects no external operational control functions. When the processing units 200–1 and 200–2 are operating in this manner, one means of trouble detection consists of matching selected common reference points in the two processing units. Such match operations can also be used as a diagnostic tool for the analysis of detected troubles.

For matching purposes, each machine cycle is divided into three match cycles designated match cycle A, match cycle B and match cycle C. These match cycles A, B and C and the clock pulses therein are illustrated in the timing chart shown in FIG. 4. One processing unit, e.g., 200–1, can perform a match operation on data obtained during any selected one of the three match cycles, e.g., match cycle A, and the other processing unit, e.g., 200–2, can perform a different match operation on data obtained during any other one of the three match cycles, e.g., match cycle B, within a single machine cycle. Thus, two separate and distinct match operations can be performed on data obtained from different sources during a single machine cycle.

The data matching system of my invention is adaptable to cooperate with any sequence of operations by duplicate processors within a machine cycle of any length of time. In the illustrative embodiment described herein, match cycles A, B and C have been arranged to correspond generally in time with various major operations of the processors described in the aforenoted Brass et al. application and to conform with the 5.5 microsecond machine cycle of those processors. However, the principles of my invention are applicable to processing arrangements employing machine cycles of a time period and having major operations occurring at times other than those employed in this illustrative embodiment by appropriate adjustment of match cycle timing.

DATA MATCHING SYSTEM COMPONENTS

Match control registers

Each of the processing units 200–1 and 200–2 includes a plurality of match control registers EMPR, IMPR, IMCR, EMCR and MMCR. Match control information is placed in these registers by central control circuit 101 by means of a communications channel 106. Additionally, the information in each of these registers is made available to central control circuit 101 by way of communications channel 106. An illustrative means of implementing the transfer of control information to and from match control registers by a central control circuit is fully described in the aforenoted copending application of Brass et al. It is equally advantageous under certain conditions to provide means for internally adjusting the control information in match control registers. An example of this type of operation is described in the aforenoted copending application of Doblmaier et al.

Internal match point control register IMPR–1 in processor 200–1 contains control information defining the data sources (match point MP1–1 through MP*n*–1 in processor 200–1 from which data will be obtained for matching by processor 200–1 with data obtained from corresponding sources in processor 200–2. External match point control register EMPR–2 in processor 200–2 contains control information defining the sources (match point MP1–2 through MP*n*–2) in processor 200–2 from which data will be obtained for matching by processor 200–1 with data obtained from corresponding sources in processor 200–1. Accordingly, the control information in registers IMPR–1 and EMPR–2 must define corresponding data sources in the respective processors 200–1 and 200–2.

Internal match point control register IMPR–2 in processor 200–2 contains control information defining the data source (match point MP1–2 through MP*n*–2) in processor 200–2 from which data will be obtained for matching by processor 200–2 with data obtained from corresponding sources in processor 200–1. External match point control register EMPR—1 in processor 200–1 contains control information defining the data sources in processor 200–1 from which data will be obtained for matching by processor 200–2 with data obtained from corresponding sources in processor 200–2. Accordingly, the control information in registers IMPR–2 and EMPR–1 must define corresponding data sources in the respective data processing units 200–2 and 200–1.

Internal match cycle control register IMCR–1 in processor 200–1 contains control information defining the match cycle A, B or C during which processor 200–1 will perform a matching operation. External match cycle control register EMCR–2 in processor 200–2 contains control information defining the match cycle A, B or C during which processor 200–1 will perform a matching operation. Accordingly, the control information in registers IMCR–1 and EMCR–2 must define the same match cycle A, B or C.

Internal match cycle control register IMCR–2 in processor 200–2 contains control information defining the match cycle A, B or C during which processor 200–2 will perform a matching operation. External match circuit control register EMCR–1 in processor 200–1 contains control information defining the match cycle A, B or C during which processor 200–2 will perform a matching operation. Accordingly, the control information in registers IMCR–2 and EMCR–1 must define the same match cycle A, B or C.

Match mode control register MMCR–1 contains control information indicating whether processor 200–1 is currently in the active condition (i.e., is currently exerting operational control over external system components) or in the standby condition (i.e., as merely duplicating the operations of processor 200–2 which is currently active). Register MMCR–1 also contains information indicating whether processor 200–1 is currently operating in parallel with processor 200–2 or is performing work operations different from the operations of processor 200–2. Register MMCR–1 also contains information defining the match condition, match or mismatch, whose observation by the matching system during a match operation will indicate a match error. The information in register MMCR–1 also defines certain fixed data sources which, under certain conditions, are used in preference to the data sources defined by the match point control registers. Register MMCR–1 also contains information indicating that processor 200–1 is currently performing a particular type of work function (e.g., a memory read operation or a memory write operation). Match mode control register MMCR–2 in processor 200–2 contains information relative to the status and mode of operation of processor 200–2 corresponding to that supplied by register MMCR–1 for processor 200–1.

The control information contained in the respective match control registers of processor 200–1 is transmitted to match control decoder MCD–1 over cables 3109–1 and 3108–1. Additionally, the information in register MMCR–1 is transmitted to circuit OCG–1 over cable 4600–1. Corresponding information transmission paths 3108–2, 3109–2 and 4600–2 are provided for the corresponding match control registers EMPR–2, IMPR–2, EMCR–2, IMCR–2, MMCR–2 in processor 200–2.

Match control decoder MCD

Match control decoder MCD–1 in processor 200–1 translates and combines the various items of control information supplied by the respective match control registers EMPR–1, IMPR–1, IMCR–1, EMCR–1 and MMCR–1 into signals representing particular match functions and match cycles. These signals are applied over conductors of cable 4600–1 to circuit OCG–1. As noted above, circuit OCG–1 logically combines these input signals with appropriate timing signals from clock circuit CLK–1 to generate gating and control signals which initiate the sequential actions taken by processor 200–1 during a data matching operation. The gating and control signals from circuit OCG–1 are distributed over conductors of cable 4209–1 to the appropirate locations in processor 200–1. The correspondingly designated components of processor 200–2 perform similar functions in that processing unit.

Match buses IMB and EMB

Internal match bus IMB–1 in processor 200–1 provides a communications highway between the various sources of match information (match points MP–1 through MP*n*–1) in processor 200–1 and the data matching systems of both processors 200–1 and 200–2. Data can be gated from bus IMB–1 either to internal match register IMR–1 in processor 200–1 or to external match bus EMB–2 in processor 200–2. Internal match bus IMB–2 in processor 200–2 serves a similar purpose in that processing unit.

External match bus EMB–1 in processor 200–1 receives data from bus IMB–2 of processor 200–2. The data thus received is gated into external match register EMR–1 of processor 200–1. Bus EMB–2 in processor 200–2 performs a similar function in that processing unit for data received from bus IMB–1 of processor 200–1.

Match registers IMR and EMR

Internal match register IMR–1 provides storage for data obtained from within data processor 200–1 for matching by processor 200–1 with corresponding data obtained from processor 200–2. External match register EMR–1 provides storage for data obtained from processor 200–2 for matching by processor 200–1 with data obtained from within processor 200–1. Match registers IMR–2 and EMR–2 in processor 200–2 serve similar purposes in that processor.

Match circuits MAT

Match circuits MAT–1 in processor 200–1 compares the data stored in match registers IMR–1 and EMR–1. An output signal is provided on one of the conductors MATCH–1 or XMATCH–1 of cable 3108–1 indicating whether or not the data in the two match registers IMR–1 and EMR–1 is the same. This signal is decoded by decoder MCD–1 to determine whether or not the indicated match or mismatch condition represents a match error. If a match error is represented by the observed match condition, a signal so indicating is forwarded from decoder MCD–1 over cable 4600–1 to circuit OCG–1. Similar functions are performed by the correspondingly designated components of processing unit 200–2.

Match error detectors MED

Match error detector MED–1 is conditioned following a match operation to indicate whether or not a match error was observed in either of the processing units 200–1 or 200–2 during the match operation. Flip-flop MEI–1 is controlled by circuit OCG–1 and is in a SET condition if a match error was observed during a match operation performed in processor 200–1. Flip-flop MEE–1 can be controlled externally by circuit OCG–2 of processor 200–2. Flip-flop MEE–1 is in a SET condition if a match error was observed during a match operation performed in processor 200–2. Flip-flop ME–1 is controlled in accordance with the condition of flip-flops MEI–1 and MEE–1. Flip-flop ME–1 is placed in a SET condition if a match error was observed during a match operation performed in either processor 200–1 or 200–2. The output signals from flip-flop ME–1 are made available to decoder MCD–1 over cable 3108–1, to circuit OCG–1, over cable 4600–1 and to central control circuit 101 over communications channel 106 so that appropriate maintenance actions can be initiated by these circuits.

Match points MP1 through MP$n$

Each of the match points MP1–1 through PM$n$–1 represents a discrete plurality of associated data sources in processor 200–1 from which data can be obtained for matching by either processor 200–1 or 200–2 with data obtained from a corresponding match point MP1–2 through MP$n$–2 in processor 200–2. The data from these sources may advantageously define input information received by the processors, output information to be transmitted from the processors, control circuit status information, data being transmitted internally between circuits within the processors, or other information indicating the status of strategic elements of the processors. An illustrative selection of data sources for matching purposes is presented in the aforenoted application of Brass et al.

Data matching operations

A single matching operation can be performed by each of the processors 200–1 and 200–2 during different match cycles of a single machine cycle. In general, one matching operation by one processor requires that the following actions be taken:

(1) The corresponding internally and externally obtained data to be matched is placed on the internal match buses IMB of both processors;

(2) The match error detectors MED of both processors are conditioned to indicate the absence of a detected match error;

(3) The internally obtained data to be matched is gated from the bus IMB of the processor in which matching will take place to the internal match register IMR of that processor;

(4) The externally obtained data to be matched is gated from the bus IMB of the other processor to the external match bus EMB of the processor in which the matching will take place and thence into the external match register EMR of that processor;

(5) The match result, match or mismatch, is decoded and, unless a match error is indicated, the match error detectors MED of both processors are conditioned to indicate a successful match.

A description will now be presented of an illustrative matching operation by both processors 200–1 and 200–2 during one machine cycle. For purposes of this description, the following assumptions are made:

(1) The control information present in register IMPR–1 of processor 200–1 defines match point MP1–1 in processor 200–1, and the control information in register EMPR–2 of processor 200–2 defines match point MP1–2 in processor 200–2;

(2) The control information in register IMPR–2 of processor 200–2 defines match point MP$n$–2 in processor 200–2, and the information in register EMPR–1 of processor 200–1 defines match point MP$n$–1 in processor 200–1;

(3) The control information in registers IMCR–1 of processor 200–1 and EMCR–2 of processor 200–2 defines match cycle A;

(4) The control information in registers IMCR–2 of processor 200–2 and EMCR–1 of processor 200–1 defines match cycle B;

(5) The control information in register MMCR–1 of processor 200–1 indicates that processor 200–1 is in the active condition, that processor 200–1 is operating in parallel with processor 200–2, and that a mismatch condition will indicate a match error;

(6) The control information in register MMCR–2 of processor 200–2 indicates that processor 200–2 is in the standby condition, that processor 200–2 is operating in parallel with processor 200–1, and that a mismatch condition will indicate a match error.

Match cycle A

In accordance with the above assumptions, processor 200–1 will perform a match operation during match cycle A on data obtained simultaneously from match point MP1–1 in processor 200–1 and from match point MP1–2 in processor 200–2. If a mismatch is detected, a match error will be indicated. This information is transmitted from the match control registers IMPR–1, IMCR–1 and MMCR–1 over cable 3109–1 and cable 3108–1 to decoder MCD–1. Corresponding information is transmitted from the match control registers EMPR–2, EMCR–2 and MMCR–2 of processor 200–2 over cables 3109–2 and 3108–2 to decoder MCD–2.

Decoder MCD–1 provides input signals to circuit OCG–1 which indicate the match cycle to be used by processor 200–1 and the sources in processor 200–1 from which data will be obtained for matching in processor 200–1. Decoder MCD–2 provides input signals to circuit OCG–2 which indicate the match cycle to be used by processor 200–1 and the sources in processor 200–2 from which data will be obtained for matching in processor 200–1.

Circuit OCG–1 combines the input signals from decoder MCD–1 with timing signals from clock CLK–1 to generate control signals which initiate the sequence of ation in processor 200–1. Circuit OCG–2 combines the input signals from decoder MCD–2 with timing signals from clock CLK–2 to generate the control signals which initiate the sequence of actions required in processor 200–2 for the performance of a matching operation in processor 200–1.

Figures 4, 5:
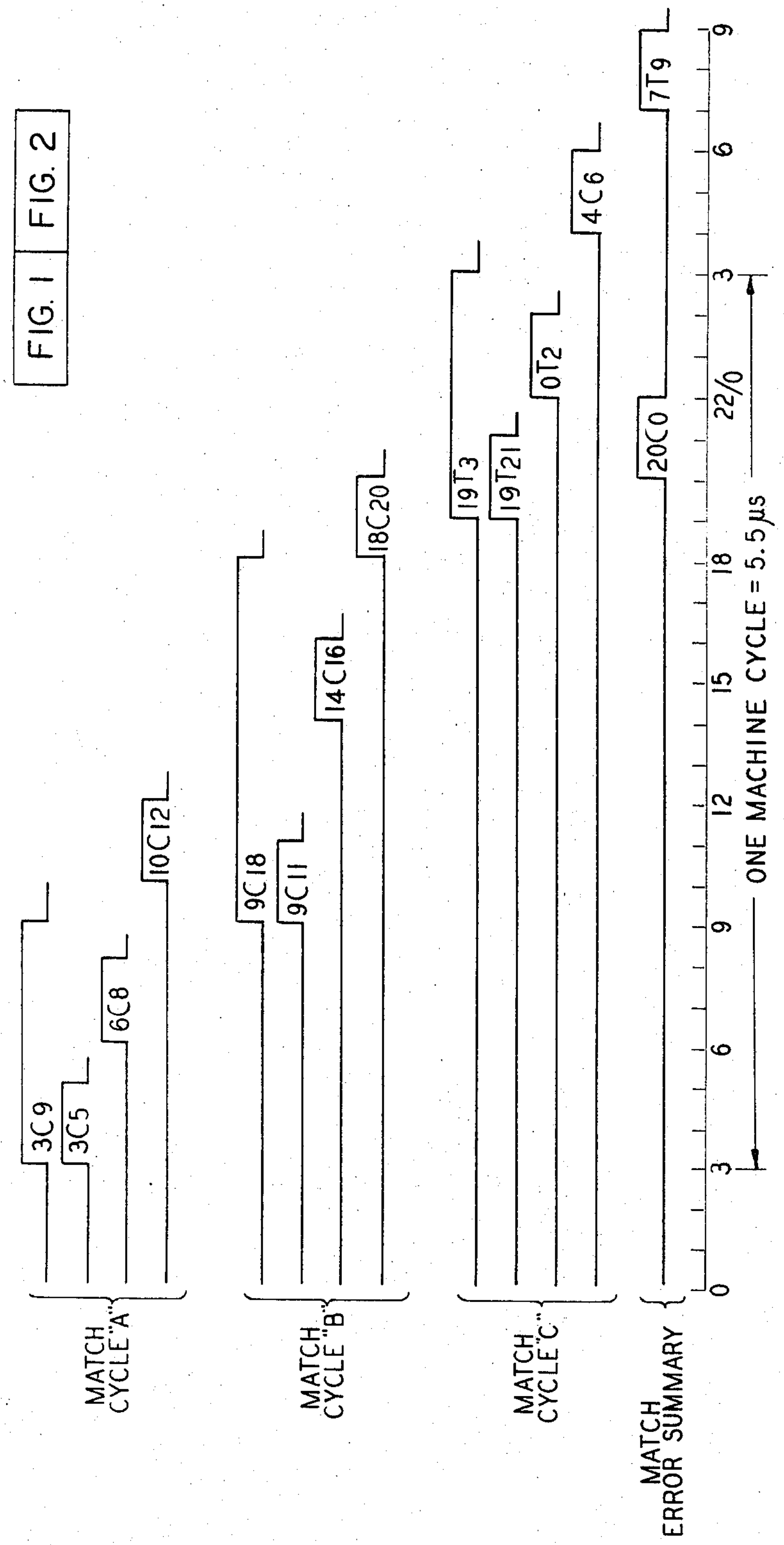
FIG. 4 is a timing diagram illustrating the subdivision of a machine cycle into match cycles and timing pulses within each match cycle.
FIG. 5 is a key diagram indicating the manner in which FIGS. 1 and 2 should be arranged.

As indicated in FIG. 4, match cycle A is subdivided into four basic timing signals 3C9, 3C5, 6C8 and 10C12. During timing signal 3C9 of match cycle A from clock CLK–1, circuit OCG–1 places a gating signal on conductor SQ1MA–1 of cable 4209–1. In response to this gating signal, the data from the sources defined by match point MP1–1 is gated through AND gates 2804–1 to internal match bus IMB–1 of processor 200–1. At the same time, during the corresponding timing signal 3C9 from clock CLK–2, circuit OCG–2 places a gating signal on conductor SQ1MA–2 of cable 4209–2. In response to this gating signal, the data from the sources defined by match point MP1–2 is gated through AND gates 2804–2 to internal match bus IMB–2 of processor 200–2.

During timing signal 3C5 of match cycle A from clock CLK–1, circuit OCG–1 places control signals on conductors REMI–1, REME–1 and SMEI–1 of cable 4209–1. The control signal on conductor REMI–1 causes register IMR–1 to be RESET in preparation for the receipt of data to be matched. The signal on conductor REME–1 causes register EMR–1 to be RESET in preparation for the receipt of data to be matched. The signal on conductor SMEI–1 causes flip-flop MEI–1 in detector MED–1 to be SET. During the corresponding timing signal 3C5 from clock CLK–2, circuit OCG–2 places a control signal on conductor SMEE–2 of cable 4209–2. This control signal causes flip-flop MEE–2 in detector MED–2 to be SET.

During timing signal 6C8 from clock CLK–1, circuit OCG–1 places a gating signal on conductor MAMI–1 of cable 4209–1. In response to this signal, the data previously placed on bus IMB–1 is gated through AND gates 2702–1 into register IMR–1. During the corresponding timing signal 6C8 from clock CLK–2, circuit OCG–2 places a gating signal on conductor MAOUT–2 of cable 4209–2. In response to this signal, the data previously placed on bus IMB–2 is gated through AND gates 2803–2 to cable 2851–2. Additionally, the signal on conductor MAOUT–2 is transmitted through amplifier 2802–2 to conductor MSYNC–2 of cable 2851–2. Cable 2851–2 is connected to cable 2850–1. Accordingly, the data on bus IMB–2 is transmitted through amplifiers 2801–1 to bus EMB–1 in processor 200–1. Further, the signal on conductor MSYNC–2 is transmitted through amplifiers 2801–1 and applied to AND gate 2712–1. Conductor $\overline{\text{INHCR–1}}$ is permanently energized by circuit OCG–1 so long as register MMCR–1 provides decoder MCD–1 with indications that processor 200–1 is operating in parallel with processor 200–2 and is matching data obtained therefrom. Accordingly, the signal on conductor

MSYNC–2 is gated through AND gate 2712–1 and applied to AND gates 2713–1. As a result, the data on bus EMB–1 is gated through AND gates 2713–1 into register EMR–1.

Since both processors 200–1 and 200–2 currently are performing the same operations on the same data, the data now stored in registers IMR–1 and EMR–1 should be identical. The data in these registers is compared by matcher MAT–1. Matcher MAT–1 either places a signal on its output conductor MATCH–1 if the data matches or places a signal on its output conductor XMATCH–1 if the data does not match. Conductors MATCH–1 and XMATCH–1 are examined by decoder MCD–1. If the match indication received from matcher MAT–1 corresponds to the match error condition specified by register MMCR–1, a match error signal is forwarded over a conductor of cable 4600–1 from decoder MCD–1 to circuit OCG–1. If no match error condition is observed, the match error signal is not sent to circuit OCG–1.

During timing signal 10C12 from clock CLK–1, if no match error signal is received from decoder MCD–1, circuit OCG–1 places a control signal on conductor REMEI–1 of cable 4209–1. This signal causes flip-flop MEI–1 in processor 200–1 to be RESET through OR gate 3707–1 and further causes flip-flop MEE–2 in processor 200–2 to be RESET through OR gate 3706–2. If, however, a match error signal is received by circuit OCG–1 from decoder MCD–1, flip-flop MEI–1 in processor 200–1 and flip-flop MEE–2 in processor 200–2 are not RESET and will remain in a SET condition.

Match cycle B

In accordance with the assumption presented earlier herein, processor 200–2 will perform a match operation during match cycle B on data obtained simultaneously from match point MP$n$–2 in processor 200–2 and from match point MP$n$–1 in processor 200–1. If a mismatch is detected, a match error will be indicated. This control information is transmitted from the match control registers IMPR–2, IMCR–2 and MMCR–2 over cable 3109–2 and cable 3108–2 to decoder MCD–2. Corresponding control information is transmitted from the match control registers EMPR–1, EMCR–1 and MMCR–1 of processor 200–1 over cables 3109–1 and 3108–1 to decoder MCD–1.

Decoder MCD–2 of processor 200–2 provides input signals to circuit OCG–2 which indicate the match cycle to be used by processor 200–2 and the sources in processor 200–2 from which data will be obtained for matching in processor 200–2. Decoder MCD–1 of processor 200–1 provides input signals to circuit OCG–1 which indicate the match cycle to be used by processor 200–2 and the sources in processor 200–1 from which data will be obtained for matching in processor 200–2.

Circuit OCG–2 combines the input signals from decoder MCD–2 with timing signals from clock CLK–2 to generate control signals which initiate the sequence of actions required for performance of a matching operation in processor 200–2. Circuit OCG–1 combines the input signals from decoder MCD–1 with timing signals from CLK–1 to generate the control signals which initiate the sequence of actions required in processor 200–1 for performance of a matching operation in processor 200–2.

As indicated in FIG. 4, match cycle B is subdivided into four basic timing signals, 9C18, 9C11, 14C16 and 18C20. During timing signal 9C18 of match cycle B from clock CLK–2, circuit OCG–2 places a gating signal on conductor MBMA–2 of cable 4209–2. In response to this gating signal, the data from the sources defined by match point MP$n$–2 is gated through AND gates 2810–2 to internal match bus IMB–2 of processor 200–2. During the corresponding timing signal 9C18 from clock CLK–1, circuit OCG–1 places a gating signal on conductor MBMA–1 of cable 4209–1. In response to this gating signal, the data from the sources defined by match point MP$n$–1 is gated through AND gates 2810–1 to internal match bus IMB–1 of processor 200–1.

During timing signal 9C11 of match cycle B from clock CLK–2, circuit OCG–2 places control signals on conductors REMI–2, REME–2 and SMEI–2 of cable 4209–2. The control signal on conductor REMI–2 causes register IMR–2 to be RESET in preparation for the receipt of the data to be matched. A signal on conductor REME–2 causes register EMR–2 to be RESET in preparation for the recipt of the corresponding data to be matched. The signal on conductor SMEI–2 causes flip-flop MEI–2 in detector MED–2 to be SET. During the corresponding timing signal 9C11 from clock CLK–1, circuit OCG–1 places a control signal on conductor SMEE–1 of cable 4209–1. This control signal causes flip-flop MEE–1 in detector MED–1 to be set.

During timing signal 14C16 from clock CLK–2, circuit OCG–2 places a gating signal on conductor MAMI–2 of cable 4209–2. In response to this signal, the data previously placed on bus IMB–2 is gated through AND gates 2702–2 into register IMR–2. During the corresponding timing signal 14C16 from clock CLK–1, circuit OCG–1 places a gating signal on conductor MAOUT–1 of cable 4209–1. In response to this signal, the data previously placed on bus IMB–1 is gated through AND gates 2803–1 to cable 2851–1. Additionally, the signal on conductor MAOUT–1 is transmitted through amplified 2802–1 to conductor MSYNC–1 of cable 2851–1.

Cable 2851–1 is connected to cable 2850–2. Accordingly, the data placed on bus IMB–1 is transmitted through amplifiers 2801–2 to bus EMB–2 in processor 200–2. Further, the signal on conductor MSYNC–1 is transmitted through amplifiers 2801–2 and applied to AND gate 2712–2. Conductor INHCR–2 is permanently energized by circuit OCG–2 so long as register MNCR–2 provides decoder MCD–2 wth indications that processor 200–2 is operating in parallel with processor 200–1 and is matching data obtained therefrom. Accordingly, the signal on conductor MSYNC–1 is gated through AND gate 2712–2 and applied to AND gates 2713–2. As a result, the data on bus EMB–2 is gated through AND gates 2713–2 into register EMR–2.

Since both processors 200–1 and 200–2 currently are performing the same operations on the same data, the data now stored in registers IMR–2 and EMR–2 should be identical. The data in these registers is compared by matcher MAT–2. Matcher MAT–2 either places a signal on its output conductor MATCH–2 if the data matches or places a signal on its output conductor XMATCH–2 if the data does not match. Conductors MATCH–2 and XMATCH–2 are examined by decoder MCD–2. If the match indication received from matcher MAT–2 corresponds to the match error condition specified by register MMCR–2, a match error signal is forwarded over a conductor of cable 4600–2 from decoder MCD–2 to circuit OCG–2. If no match error condition is observed, the match error signal is not sent by decoder MCD–2 to circuit OCG–2.

During timing signal 18C20 from clock CLK–2, if no match error signal is received from decoder MCD–2, circuit OCG–2 places a control signal on conductor REMEI–2 of cable 4209–2. This control signal causes flip-flop MEI–2 in processor 200–2 to be RESET through OR gate 3707–2 and further causes flip-flop MEE–1 in processor 200–1 to be RESET through OR gate 3706–1. If, however, a match error signal is received by circuit OCG–2 from decoder MCD–2, flip-flop MEI–2 in processor 200–2 and flip-flop MEE–1 in processor 200–1 are not RESET and will remain in a SET condition.

Match error indication

As a result of the above-described actions taken during match cycles A and B in processors 200–1 and 200–2, the condition of flip-flops MEI–2 and MEE–2 indicates whether or not a match error was detected by the matching system of processor 200–1, and the condition of flip-flops MEI–2 and MEE–1 indicates whether or not a match error was detected by the matching system in processor 200–2. After the match operations are completed in both processors 200–1 and 200–2, the match error flip-flops ME–1 and ME–2 in both processors 200–1 and 200–2 are conditioned to indicate a match error if such an error was detectedby either of the processors 200–1 and 200–2.

During timing signal 20C0 from clock CLK–1 of the machine cycle including the above-described match cycles A and B, circuit OCG–1 places gating signals on conductors SIME–1 and SEME–1 of cable 4209–1. These signals are applied respectively to AND gates 3708–1 and 3709–1. If flip-flop MEI–1 is in a set condition, the signal on conductor SIME–1 is gated through AND gate 3708–1 and OR gate 3710–1 causing flip-flop ME–1 to be SET. Similarly, if flip-flop MEE–1 is in a SET condition, the signal on conductor SEME–1 is gated through AND gate 3709–1 and OR gate 3710–1 causing flip-flop ME–1 to be SET. Thus, if either of the flip-flops MEI–1 or MEE–1 remains in a SET condition after completion of matching operations by the processors 200–1 and 200–2, flip-flop ME–1 will be SET during the later portion of the machine cycle.

During the corresponding timing signal 20C0 from clock CLK–2 of the machine cycle including the above-described match cycles A and B, circuit OCG–2 places gating signals on conductors SIME–2 and SEME–2 of cable 4209–2. In a manner similar to that described for processor 200–1, flip-flop ME–2 is SET by the gating signal if either of the flip-flops MEI–2 or MEE–2 remain in a SET condition. Thus, flip-flop ME–2 will be SET during the latter portion of a machine cycle if a match error was detected in either processor 200–1 or 200–2 during that machine cycle.

As mentioned earlier herein, the match error indication on the 1 output conductor of match error flip-flops ME–1 and ME–2 is transmitted to the respective decoders MCD–1 and MCD–2, the respective circuits OCG–1 and OCG–2, and to central control 101. Appropriate maintenance actions are then initiated by each of these circuits.

Match cycle C

As indicated in FIG. 4, match cycle C is subdivided in to four basic timing signals 19T3, 19T21, 0T2 and 4C6. The sequential actions taken during these timing signals for a match operation during match cycle C are identical to those taken during the corresponding timing signals of match cycles A and B, as described above. However, the conditioning of the match error detector MED–1 or MED–2 is delayed until an early time (4C6) during the next machine cycle. Accordingly, the conditioning of flip-flops ME–1 and ME–2 is similarly delayed until the signal 7T9 of the machine cycle following that during which the match operation is performed. The specific advantages of the use of different clock signals (C and T) for controlling an operation during match cycle C is discussed in the aforementioned Brass et al. patent application. Additionally, the advantage of delaying conditioning of the match error flip-flops ME–1 and ME–2 is presented in that application. Details of these advantages are not necessary to an understanding of my present invention and, therefore, are omitted from this description.

TABLE OF COMPONENTS

The following is a list of component parts of the various schematic blocks shown in FIGS. 1 and 2 of the present application. While various components, known in the art, may be employed, this list is intended to illustrate in terms of the more detailed showing of the aforenoted Brass et al. patent application one manner of implementing my invention. Each of the components listed below is described by its designation and the figure number of the Brass et al. application in which it is shown:

Match error detector MED; FIG. 37—flip-flops MEE, MEI and ME
Internal match register IMR, FIG. 27—27IMR
External match register EMR, FIG. 27—27EMR
Matcher MAT, FIG. 27—27MAT
Internal match point register IMPR, FIG. 31—flip-flops MPI0, MPI1 and MPI2
External match point register EMPR, FIG. 31—flip-flops MPE0, MPE1 and MPE2
Internal match cycle register IMCR, FIG. 31—flip-flops MCI0 and MCI1
External match cycle regiser EMCR, FIG. 31—flip-flops MCE0 and MCE1
Match mode control register MMCH, FIG. 34—flip-flops MNM, DIV and AU; FIG. 44—flip-flops SPWFF and DRFF; FIG. 31—flip-flops MCV and MCO; FIG. 33—flip-flop MCCR
Match control decorder MCD, FIG. 31—decoder 31-MCD
Clock circuit CLK, FIG. 47—clock 47CLK
Order combining gate circuit OCG, FIG. 42 et cetera—OCG circuit 42OCG It is to be understood that there has been shown but one specific illustrative embodiment of my invention and that many variations may be made without departing from the spirit and scope of my invention.

What is claimed is:

1. A data processing arrangement having a periodic machine cycle and comprising
 a plurality of data sources,
 a plurality of register pairs,
 means including a pair of common buses for gating pairs of data from selected ones of said data sources to different register pairs during different time intervals within a single machine cycle of said data processing arrangement,
 individual match means for matching said pairs of data in each of said different register pairs,
 and means responsive to all of said match means for indicating the results of said matching.

2. A data processing arrangement in accordance with claim 1 further comprising
 a source of match control information specifying said selected data sources, said different register pairs and said different time intervals;
 match control means for controlling said gating means in accordance with said match control information;
 and means for transmitting said match control information from said source thereof to said match control means.

3. A data processing arrangement in accordance with claim 2 wherein said match control means comprises
 a plurality of match control registers for registering said match control information,
 and decoding means connected between said match control registers and said gating means.

4. A data processing arrangement in accordance with claim 2 further comprising
 clock means associated with each of said match means for periodically defining said machine cycle and said different time intervals therein,
 and means associated with said match control information source for synchronizing together all said clock means.

5. A data processing arrangement in accordance with claim 2 wherein
 each of said match means provides first and second match result signals in accordance with the agreement and disagreement of said pairs of data matched thereby,
 said match control information specifies one of said match result signals as indicative of a match success condition,
 and said match control means comprises means responsive to said match control information and said specified match result signals for generating match success signals.

6. A data processing arrangement in accordance with claim 1 wherein said indicating means comprises
 first indicating means associated with each of said match means for indicating the results of matching thereby,
 and second indicating means responsive to an error indication from any of said first indicating means for indicating a match error.

7. In a data processing machine having a pair of duplicate processors for simultaneously performing identical operations on input data, each of said processors including a plurality of data sources, an arrangement for increasing the error detection capabilities of the machine comprising
 means in each of said processors for matching data obtained from a data source within said each processor with data obtained from a corresponding data source within the other of said processors,
 said matching means of the first of said processors operating on data from a selected corresponding pair of said sources and said matching means of the second of said processors operating on different data obtained from a selected corresponding pair of said data sources,
 and means responsive to both said matching means for indicating the match results thereof.

8. In a data processing machine, the arrangement of claim 7 wherein said selected corresponding pair of sources of data operated on by said matching means of said first processor is different from said selected corresponding pair of sources of data operated on by said matching means of said second processor.

9. In a data processing machine, the arrangement of claim 7 wherein each of said matching means includes an internal match register and an external match register,
 the arrangement further comprising clock means in each of said processors for defining periodic machine cycles and a plurality of match cycles within each of said machine cycles,
 and means controlled by both said clock means for connecting said data sources of each processor alternatively and during different match cycles to the internal match register of said each processor and to the external match register of the other of said processors.

10. In a data processing machine, the arrangement of claim 9 wherein
 said match cycles defined by both said clock means are partially overlapping in time,
 said connecting means is controlled during a nonoverlapping time portion of the earlier of said different match cycles to connect said data sources to the internal match register of said each processor and controlled during a nonoverlapping time portion of the later of said different match cycles to connect said data sources of said each processor to the external match register of the other of said processors,
 and said indicating means includes first indicating means responsive to one of said matching means durin an overlapping time portion of the earlier of said different match cycles and second indicating means responsive to the other of said matching means during an overlapping time portion of the later of said different match cycles.

11. In a data processing machine, the arrangement of claim 9 further comprising
 a source of match control information specifying corresponding pairs of data sources and different match cycles,
 control register means in each of said processors for registering match control information,
 and selecting means in each of said processors controlled by said control register means for selecting said corresponding pairs of data sources and said different match cycles in accordance with said registered match control information.

12. In a data processing machine, the arrangement of claim 7 wherein said indicating means includes
 first storing means in each processor for storing match results of said matching means in one of said processors,
 second storing means in each processor for storing match results of said matching means in the other of said processors,
 and means in each processor controlled by both said storing means in said each processor for generating a match error signal.

13. In a data processing machine having an active processor and a standby processor for simultaneously performing identical operations on input data, each of said processors including a plurality of data sources corresponding to a plurality of data sources in the other of said processors;
 an arrangement for increasing the error detection capabilities of the machine comprising
 first matching means in one of said processors and second matching means in the other of said processors, each matching means for comparing data received from said corresponding sources and for generating match result signals indicating whether or not the compared data is identical;
 clock means in each of said processors for defining synchronized periodic machine cycles and a plurality of match cycles within each machine cycle;

means controlled by both said clock means for transmitting data simultaneously from corresponding data sources in both said processors to said first matching means during one match cycle of a machine cycle and for transmitting data simultaneously from corresponding data sources in both processors to said matching means during another match cycle of said machine cycle;

means in each processor responsive to one of said match result signals from said first matching means and to one of said match result signals from said second matching means for storing indications thereof;

and means in each processor controlled by said storing means for generating a match error signal.

14. In a data processing machine, the arrangement of claim 13 further comprising a source of match control information specifying said corresponding data sources, and said one and said other match cycles;

control register means in each of said processors for registering said match control information, means for communicating said match control information from said source thereof to both said control register means, and decoder means for controlling said transmitting means in accordance with said match control information registered in said control register means.

15. In a data processing machine, the arrangement of claim 14 wherein said match cycles defined by said clock means are partially overlapping, said transmitting means is controlled by said clock means and said decoder means to transmit said data to said first and second matching means during nonoverlapping time portions of said one and said other match cycles, and said storing means are responsive to said ones of said match result signals during overlapping time portions of said match cycles.

16. In a data processing machine, the arrangement of claim 13 further comprising a source of match control information specifying said ones of said match result signals from said first and second matching means, register means in each processor for registering said match control information, means for transmitting said match control information from said source thereof to both said register means, and decoder means for controlling said response of said storing means to said match result signals in accordance with said match control information registered in said register means.

References Cited

UNITED STATES PATENTS

| | | | |
|---|---|---|---|
| 2,688,656 | 9/1954 | Wright et al. | |
| 3,054,560 | 9/1962 | Hartley | 235—153 X |
| 3,252,149 | 5/1966 | Weida et al. | |

MALCOLM A. MORRISON, Primary Examiner

R. S. DILDINE, Assistant Examiner

U.S. Cl. X.R.

235—61.7; 340—146.1, 146.2